United States Patent
Chen

(10) Patent No.: US 7,520,668 B2
(45) Date of Patent: Apr. 21, 2009

(54) MULTI FUNCTION THERMOMETER

(75) Inventor: Ieon Chen, Laguna Hills, CA (US)

(73) Assignee: Innova Electronics Corporation, Fountain Valley, CA (US)

( * ) Notice: Subject to any disclaimer, the term of this patent is extended or adjusted under 35 U.S.C. 154(b) by 0 days.

(21) Appl. No.: 11/657,349

(22) Filed: Jan. 24, 2007

(65) Prior Publication Data

US 2008/0175301 A1 Jul. 24, 2008

(51) Int. Cl.
G01J 5/04 (2006.01)
G01K 13/00 (2006.01)

(52) U.S. Cl. .................. 374/121; 374/142; 374/170; 374/208

(58) Field of Classification Search ............... 374/101, 374/120, 121, 129, 141, 142, 163, 166, 170, 374/179–182, 183, 185, 208; 600/549
See application file for complete search history.

(56) References Cited

U.S. PATENT DOCUMENTS

| | | | | |
|---|---|---|---|---|
| 5,743,644 | A * | 4/1998 | Kobayashi et al. | 374/126 |
| 6,095,682 | A * | 8/2000 | Hollander et al. | 374/121 |
| 6,377,400 | B1 * | 4/2002 | Hollander | 359/618 |
| 6,617,971 | B2 * | 9/2003 | Keller | 340/584 |
| 6,751,497 | B2 * | 6/2004 | Fraden | 600/474 |
| 7,163,336 | B2 * | 1/2007 | Blakeley, III | 374/142 |
| 2001/0040911 | A1 * | 11/2001 | Rubenstein | 374/141 |
| 2005/0226307 | A1 * | 10/2005 | Lussier et al. | 374/131 |
| 2007/0171957 | A1 * | 7/2007 | Harris | 374/121 |

OTHER PUBLICATIONS

Extech Instruments Product Datasheet, model IR301 http:web.archive.org/web/20060312090028/http://www.extech.com/instrument/products/alpha/datasheets/IR301.pdf Publication date: Mar. 12, 2006.*

Extech Instruments Product Product User's Guide, model IR301 http://web.archive.org/web/20060312093830/http://www.extech.com/instrument/products/alpha/manuals/IR301_UM.pdf Publication date: Mar. 12, 2006.*

Max's Large Image Review, Thermo Tech Non-Contact Infrared Digital Thermometer w/ Free Holster Item #TT1382, http://www.maxtool.com/product/search.asp? mdb=/tools.mdb,tbl=IC_ITEMS,template=/..., Dec. 18, 2007, 1 page.

(Continued)

*Primary Examiner*—Patrick J Assouad
*Assistant Examiner*—Bret Adams
(74) *Attorney, Agent, or Firm*—Stetina Brunda Garred & Brucker

(57) ABSTRACT

A multi function thermometer is provided which operates to display temperatures sensed by one or more temperature sensors. The thermometer comprises a thermometer housing and a temperature probe engaged to the housing, the probe being translatable between a first stowed position and a second deployed position. An infrared temperature reader element is also engaged to the housing, and operative to sense the temperature of objects remote from the housing, within a field of view of the infrared reader element. A temperature display is connected to the retractable probe and to the infrared temperature reader element. The display is operative to display temperatures sensed by the retractable probe and/or the infrared reader element.

11 Claims, 2 Drawing Sheets

OTHER PUBLICATIONS

Thermo Works-Combo Thermapen-Infrared + Thermocouple Probe Thermometer, Combo Thermapen Infrared with Fold-Out Probe, http://www.thermoworks.com/products/ir/combo_thermapen.html, Dec. 18, 2007, 2 pages.

DeWalt tools and accessories-MaxTool.com, Non-Contact Infrared Digital Thermometers, http://www.maxtool.com/index/Digital_Infrared_Non-Contact_Thermometers.asp, Dec. 18, 2007, 3 pages.

MSC Item Detail, Extech Instruments Item #07402175, http://www1.mscdirect.com/CGI/NNSRIT?PMPXNO=8360765&PMT4NO=0, Dec. 18, 2007, 1 page.

MSC Item Detail, Extech Instruments Item #88147111, http://www1.mscdirect.com/CGI/NNSRIT?PMPXNO=9267299&PMT4NO=0, Dec. 18, 2007, 1 page.

MSC Item Detail, Fluke. Item #79241584, http://www1.mscdirect.com/CGI/NNSRIT?PMPXNO=12220&PMT4NO=0, Dec. 18, 2007, 1 page.

Hammacher Schlemmer, The Instant Read Infrared Surface Thermometer, http://www.hammacher.com/publish/74703.asp?promo=pe_health, Dec. 16, 2007, 1 page, Hammacher Schlemmer & Company, Inc., New York.

* cited by examiner

MULTI FUNCTION THERMOMETER

CROSS-REFERENCE TO RELATED APPLICATIONS

Not Applicable

STATEMENT RE: FEDERALLY SPONSORED RESEARCH/DEVELOPMENT

Not Applicable

BACKGROUND

The present invention relates to thermometers, and, more particularly, to a hand held, multi function thermometer including alternate means for measuring temperature.

Various types of thermometers are in use by the general public, food preparers and skilled technicians. Probe based thermometers utilize a shaft having a temperature sensitive member that senses the surrounding temperature and communicates that to a display, such as a digital circuit. The display may operate to indicate the temperature in degrees Celsius or degrees Fahrenheit. Such thermometers may also include audible signals to indicate reaching a select temperature, temperature stabilization, as well as other functions that may be of use for a particular application.

More recently, infrared thermometers have been provided which measure a temperature along a line of sight (los) defined by an infrared temperature reading element. The temperature sensed by the infrared reader element may be communicated to a display, such as a digital display, which may display the temperature, e.g. in degrees Celsius or degrees Fahrenheit. The thermometer may again incorporate other functionalities, such as audible alarms to indicate reaching a temperature threshold, temperature stabilization, etc. Such infrared thermometers are particularly useful where the space is confined, where a probe cannot extend to the location where the temperature measurement is sought, or where a probe is otherwise inadvisable, e.g. to measure ear temperature.

Professional technicians, such as safety engineers and others may have the need to perform temperature measurements in fluids or on heatable surfaces, where a single type of temperature probe may not be suitable. Given potential constraints on physical access, hot temperatures of surfaces or fluids to be measured, and other considerations, the use of a multifunction thermometer that allows switchable modes of operation to accommodate different circumstances would be desirable. Further, given the prospect that a user may be simultaneously operating other equipment, maintaining a position, or otherwise have one hand otherwise engaged in related activity, it would be desirable if a multi function thermometer is implemented as a device that can be held and operated in a single hand, readily switchable from one mode to another, e.g. from infrared mode to probe mode, by single handed operation.

The present invention is intended to provide a multi function thermometer which addresses these and other concerns, providing ease of use, simple, reliable operation, with an easy to read display.

BRIEF SUMMARY

A multi function thermometer is provided which operates to display temperatures sensed by one or more temperature sensors. The thermometer comprises a thermometer housing and a temperature probe engaged to the housing, the probe being translatable between a first stowed position and a second deployed position. An infrared temperature reader element is also engaged to the housing, and operative to sense the temperature of objects remote from the housing, within a field of view of the infrared reader element. A temperature display is connected to the retractable probe and to the infrared temperature reader element. The display is operative to display temperatures sensed by the retractable probe and/or the infrared reader element.

A laser pointer may also be connected to the housing, proximate the infrared temperature reader element. The laser pointer is operative to illuminate an object remote from the thermometer, within the infrared temperature reader element field of view.

A switch is provided which may operate to power the infrared reader element, the laser pointer, and the display, to display temperatures sensed by the infrared reader element.

The thermometer may include a probe release mechanism, for releasing the probe from a stowed position, enabling power to the probe, and enabling the display of temperature readings sensed by the probe. The probe may also be manually translatable between the stowed position and the deployed position. Activation of the probe release mechanism, or other translation of the probe between the stowed position and the deployed position, may function to regulate the display of temperatures sensed by the probe, and/or modify the display, e.g. to transition between a single screen and split screen display. In such a manner, the display may illustrate both the temperature sensed by the probe, and the temperature sensed by the infrared temperature reader element.

A magnet may further be provided, connected to the housing, for securing the housing to a metallic surface.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The above description is given by way of example, and not limitation. Given the above disclosure, one skilled in the art could devise alternate embodiments that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

Figures 1, 2:
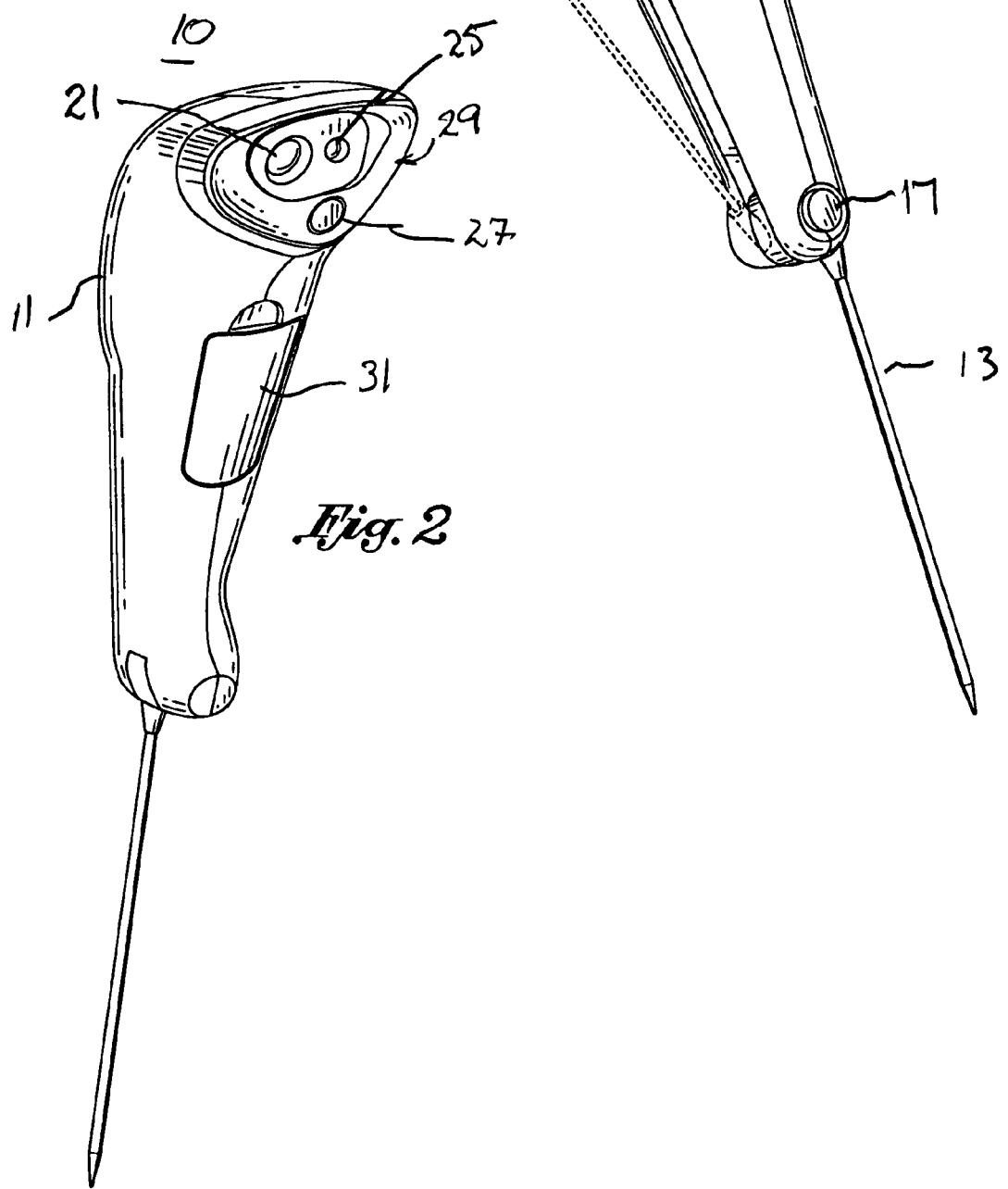
FIG. 1 is a front perspective view of the invention, with the partially retracted probe shown in phantom lines.
FIG. 2 is a rear perspective view of the invention.

FIG. 1 illustrates a multi function thermometer 10 constructed in accordance with one implementation of the present invention. The thermometer 10 includes a housing 11 having a retractable probe 13 translatably extendable from a first position, such as within a housing recess 15 and a second position, extended from the housing, as shown at FIG. 1. The probe 13 may be deployable in response to activation of a probe release mechanism, activated by depression of probe release button 17. As described more fully below, the probe release mechanism may enable power to the probe 13 and display 19, enabling display 19 to display temperature data sensed by probe 13. As also described more fully below, the display 19 may be implemented as a dual display, to allow display of both temperatures sensed by probe 13, and the temperature sensed by infrared reader element 21, as shown in FIG. 2.

Thermometer 10 further includes infrared reader switch 23 operative to actuate the infrared temperature reader element 21, laser pointer 25, and/or other functions. In the presently preferred embodiment control switch 23 activates both infrared reader element 21 and laser pointer 25. The laser pointer 25 illuminates a point within the field of view of infrared temperature reader element 21, to facilitate proper directing of the infrared temperature reader element 21, by directing the laser pointer to the location where the temperature is to be measured. The infrared temperature reader element 21 and laser pointer 25 are both engaged to the housing 11, proximate each other, so that the laser pointer illuminates a location within the field of view of infrared reader element 21, as further illustrated in FIG. 3.

As will be apparent to those skilled in the art, control switch 23 may be implemented in various alternate ways to allow selective activation of the infrared reader element 21, laser pointer 25, enable temperature readings from probe 13, or implement display of various information on display 19.

The thermometer 10 may also be provided with a magnet 27, engaged to the front face 29 of housing 11. The magnet 27 is useful to secure the thermometer 10 to a metallic surface, when not in use.

The thermometer 10 may be powered by batteries disposed within the housing 11, accessible by opening battery closure 31.

Figure 3:
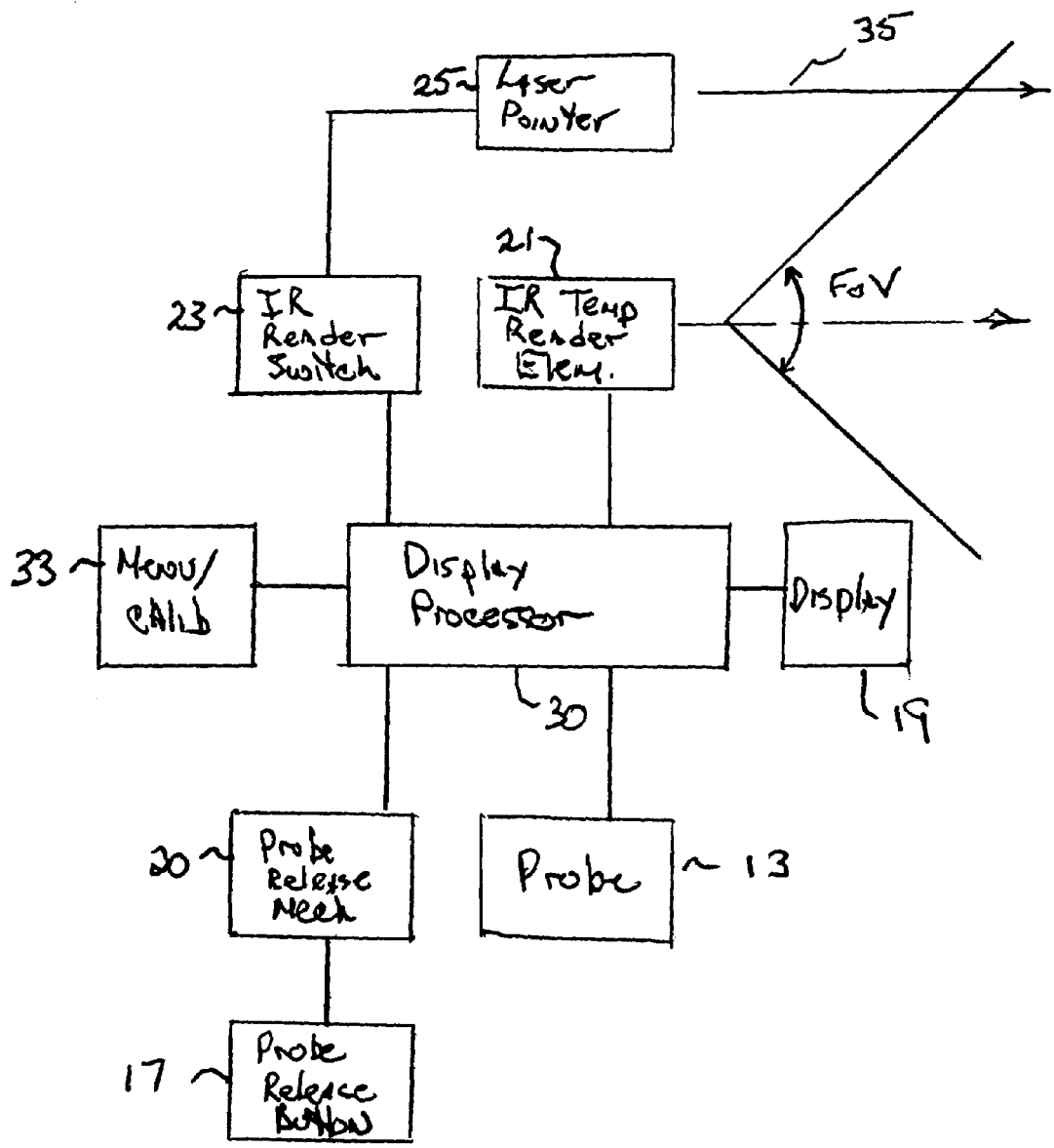
FIG. 3 is a block diagram illustrating an exemplary electrical circuit for operation o the invention.

FIG. 3 illustrates an exemplary block diagram depicting one operational embodiment of thermometer 10. As described above, temperature readings may be taken using probe 13 or infrared reader element 21, which may be controlled by and communicate with display processor 30 disposed within housing 11, which also regulates information shown on display 19. Depression of probe release button 17 activates probe release mechanism 20, which facilitates deployment of the probe 13 from recess 15 to the deployed position shown at FIGS. 1 and 2. Probe release mechanism 20 may also communicate a signal to display processor 30, indicating that probe 13 has been deployed or retracted. In response to a signal indicating that probe 13 has been deployed, display processor 30 operates to enable display 19 to display of temperature information sensed by probe 13. Alternatively, deployment of probe 13 may transition display 19 from a single screen display to a split screen display, adding display of information from probe 13 to other information being displayed at display 19. Similarly, retraction of probe 13 may transition the display from a dual screen display to a single screen display. In the same manner, the display 19 may transition from a single display to a dual display, in response to activation of infrared reader element 21, e.g. in response to depression of infrared sensor switch 23.

In the presently preferred embodiment, activation of infrared sensor switch 23 also activates laser pointer 25 and infrared reader element 21. Activation of infrared switch 23 is detected by display processor 30, which in turn activates infrared reader element 21, and enables a display of information received by infrared reader element 21 at display 19. As described above, the laser pointer 25 generates a light beam 35 which is directed to a location within the field of view (FoV) of infrared reader element 21.

Other functions of thermometer 10 may be implemented by use of menu/calibration control 33, in conjunction with further operation of infrared sensor switch 23, display processor 30 and display 19. For example, the infrared sensor switch 23 in cooperation with menu/calibration control 33 and display processor 30 may operated to enable display of menu options or calibration features, such as alternating between measures of temperature, i.e. degrees Fahrenheit or degrees Celsius. Switch 23 may also be operated to vary the nature of information displayed on display 19, such as by single display, dual display, or automatic alternating between the two, e.g. in response to deployment/retraction of the probe 13.

In practice, thermometer 10 may be utilized in a variety of different applications. In cooking applications, internal food temperature may be measured by insertion of probe 13 within the food. The temperature of oils or other liquids being heated to certain temperatures to properly crisp or cook foods may be measured by operation of infrared temperature reader 21. Either may be done using a single handed operation of thermometer 10, while the food or pot is held in place with the other hand. After the temperatures have been read, the thermometer may be simply secured to an available metal surface, such as a refrigerator or other surface by engagement of magnet 27 to an available metallic surface.

For applications outside the kitchen, the thermometer 10 may be used to read surface temperatures of various mechanical/electrical devices. In safety engineering environments, a technician may use thermometer 10 to read surface temperatures of electrical components such as transformers, generators, and other devices. Automotive mechanics may use thermometer 10 to measure conditions such as brake rotor temperature, radiator temperature, catalytic converter temperature and HVAC temperature.

As will be apparent to those skilled in the art, the multi function thermometer of the present invention is also applicable for many other functions and applications.

What is claimed is:

1. A multi function thermometer comprising:
   a thermometer housing;
   a temperature probe engaged to the housing, the probe being translatable between a first stowed position and a second deployed position;
   an infrared temperature reader element engaged to the housing and operative to sense the temperature of objects remote from the housing, within a field of view of the infrared reader element;
   a temperature display connected to the retractable probe and to the infrared temperature reader element, the display being operative to display temperatures sensed by the retractable probe and/or by the infrared reader element; and
   a probe release mechanism for releasing the probe from the stowed position and for communicating a signal that indicates position of the probe to the display.

2. The multi function thermometer set forth in claim 1 further comprising a laser pointer connected to the housing, proximate the infrared temperature reader element, the laser pointer being operative to illuminate an object remote from the thermometer, within the infrared temperature reader element field of view.

3. The multi function thermometer as set forth in claim 2 further comprising a switch for powering the infrared reader element, the laser pointer, and the display, to display temperatures sensed by the infrared reader element.

4. The multi function thermometer as set forth in 1 wherein the probe release mechanism is operative to enable power to the probe and the display of temperature readings sensed by the probe in response to the signal.

5. The multi function thermometer as set forth in claim 4 wherein the probe is manually translatable between the stowed position and the deployed position.

6. The multi function thermometer set forth in claim 5 wherein the probe release mechanism is operative to enable display of temperatures sensed by the probe, in response to translation of the probe between the stowed position and the deployed position.

7. The multi function thermometer as recited in claim 1 further comprising a magnet connected to the housing, for securing the housing to a metallic surface.

8. The multi function thermometer as set forth in claim 1 wherein the display comprises a first display portion for displaying a temperature sensed by the infrared reader element, and a second display portion for displaying the temperature sensed by the temperature probe.

9. The multi function thermometer as set forth in claim 1 wherein the display transitions from a single display to a dual display in response to activation of the probe release mechanism.

10. The multi function thermometer as set forth in claim 1 wherein the display transitions from a dual display to a single display in response to retraction of the probe release mechanism.

11. The multi function thermometer as set forth in claim 1 wherein the display transitions from a single display to a dual display in response to activation of the infrared reader element.

* * * * *